G. Pierce,
Horse Rake.

No. 1921 Reissued Mar. 28. 1865.

UNITED STATES PATENT OFFICE.

GIDEON PEIRCE, OF ERCILDOUN, PENNSYLVANIA.

IMPROVEMENT IN HORSE-RAKES.

Specification forming part of Letters Patent No. 26,293, dated November 29, 1859; Reissue No. 1,640, dated March 22, 1864; Reissue No. 1,921, dated March 28, 1865.

*To all whom it may concern:*

Be it known that I, GIDEON PEIRCE, of Ercildoun, in the county of Chester and State of Pennsylvania, have invented a new and useful Improvement in Horse-Rakes; and I do hereby declare the following to be a full and exact description of the same, reference being had to the accompanying drawings, making part of this specification, in which—

Figure 1:
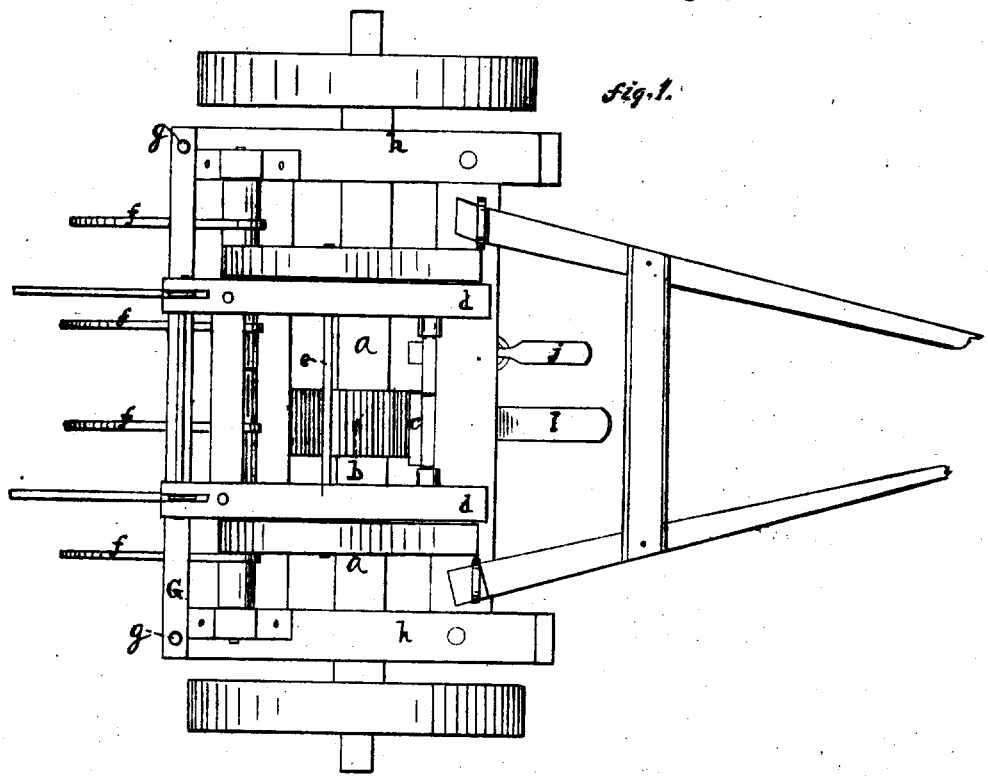
Figure 2:
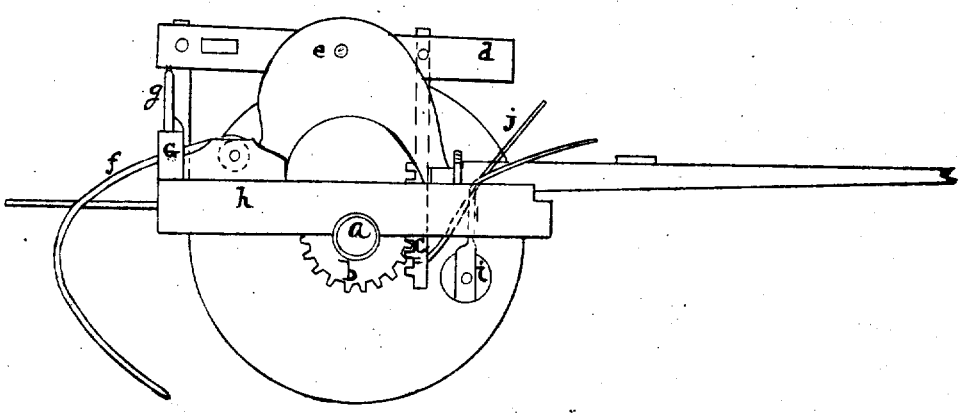

Figure 1 is a plan of a horse-rake embodying my invention. Fig. 2 is a side elevation of the same with the nigh wheel removed.

Similar letters of reference indicate corresponding parts in the two figures.

This invention consists chiefly in the employment of certain novel devices for effecting the necessary movement of the rake to discharge the hay by the power of the horse, and for holding the rake down to its working position.

It further consists in the employment of a bar provided with mortises for the reception of the rake-teeth, so as to enable the ordinary staples to be dispensed with, the said bar effecting the purposes of raising and holding down the teeth and affording them the necessary independent play, all as will be hereinafter fully explained.

In order that others skilled in the art to which my invention appertains may be enabled to fully understand and use the same, I will proceed to describe its construction and operation.

In the accompanying drawings, *a* is an axle, which constitutes the chief support for the various operating parts of the implement. One carrying-wheel is keyed to the axle for the purpose of imparting rotation thereto, and the other carrying-wheel is journaled upon the axle in order that the machine may freely turn.

*b* is a cog-wheel, secured upon and rotating with the axle *a*.

*c* is a vertical rack, pivoted at its upper end to a frame, *d*, which is pivoted at *e* to standards rising from the main frame *h*.

*f f* represent the rake-teeth, which are attached to the rake-head in customary manner, to admit of being raised simultaneously when the hay is to be discharged.

G is a bar attached to the frame *d*, so as to be raised or depressed therewith, and working at each end on a small standard, *g*, rising from the main frame *h*, the standards *g* serving to govern the motion of the bar G. Other suitable guides or attachments may be used for this purpose.

The rake-teeth *f*, instead of passing through staples as hitherto, pass through mortises or slots in the bar G, which slots are of such vertical length as to allow the teeth *f* the requisite independent movement to conform to any inequalities of the ground or override moderate substances with which they may come in contact.

I is a lever carrying at its lower end a friction-wheel or pulley, *i*, and employed to press and retain the rack *c* against the cog-wheel *b*. When the rack and cog-wheel are thus thrown in connection, and the cog-wheel rotated by the forward movement of the machine, the wheel *i* rotates to permit the rack *c* to be moved downward by the action of the teeth of the wheel *b*. This downward movement of the rack *c* elevates the rear end of the frame *d*, and the bar G, being attached to said frame *d*, is thus raised, so as to throw up the rake-teeth and permit the discharge of the grain.

J is a lever which, when depressed, exerts an upward pressure on the forward end of the frame *d*, in order to keep the rake-teeth *f* firmly down to their work.

The levers I and J may be adapted to be operated by either the foot or hand.

It will require little force to retain the rack *c* in connection with the wheel *b*, and by the employment of these devices, with their appurtenances, the necessary power to elevate the rake is derived from the horse, and hence the labor of the attendant is greatly reduced and facilitated.

Having thus described my invention, the following is what I claim as new herein and desire to secure by Letters Patent—

1. A toothless revolving axle supporting the main frame, and provided at any point between the ground-wheels with a wheel or roller for raising the rake-teeth, when used in combination with teeth pivoted in the rear of the said axle and drawn up by leverage, substantially as herein described.

2. The vertically-adjustable bar G, extending partially or wholly across the machine, supported upon guide-pins *g g*, and provided with vertical mortises through which the teeth pass, substantially as set forth.

3. The combination of the rocking frame *d*, the rack *c*, and the lever I, for raising the teeth by the power of the horse, substantially in the manner described.

GIDEON PEIRCE.

Witnesses:
LUKENS PEIRCE,
JOSIAH W. PYLE.